(12) United States Patent
Zudrell-Koch

(10) Patent No.: US 8,918,118 B2
(45) Date of Patent: Dec. 23, 2014

(54) METHOD, APPARATUS AND SYSTEM FOR ADDRESSING OPERATING DEVICES FOR LUMINAIRES

(75) Inventor: Stefan Zudrell-Koch, Hohenems (AT)

(73) Assignee: Tridonic GmbH & Co. KG

( * ) Notice: Subject to any disclaimer, the term of this patent is extended or adjusted under 35 U.S.C. 154(b) by 40 days.

(21) Appl. No.: 13/813,633

(22) PCT Filed: Jul. 27, 2011

(86) PCT No.: PCT/EP2011/062884
§ 371 (c)(1),
(2), (4) Date: Feb. 28, 2013

(87) PCT Pub. No.: WO2012/016893
PCT Pub. Date: Feb. 9, 2012

(65) Prior Publication Data
US 2013/0172012 A1 Jul. 4, 2013

(30) Foreign Application Priority Data
Aug. 2, 2010 (DE) .......................... 10 2010 038 792

(51) Int. Cl.
*H04L 29/12* (2006.01)
*H04W 24/00* (2009.01)
*H04M 11/02* (2006.01)
*H05B 37/02* (2006.01)

(52) U.S. Cl.
CPC ...... *H04L 61/2038* (2013.01); *H04L 29/12254* (2013.01); *H04L 29/12981* (2013.01); *H04L 61/609* (2013.01); *H04M 11/025* (2013.01); *H05B 37/0272* (2013.01); *H04W 24/00* (2013.01)

USPC ...... 455/456.2; 362/145; 362/233; 455/456.1

(58) Field of Classification Search
CPC ..... H04W 64/00; H04W 4/02; H04W 64/003; H04W 24/00; H04W 4/021
USPC ..................... 455/456.1, 456.3, 457
See application file for complete search history.

(56) References Cited

U.S. PATENT DOCUMENTS

| 3,527,932 | A | 9/1970 | Thomas | |
|---|---|---|---|---|
| 2003/0212684 | A1 | 11/2003 | Meyer et al. | |
| 2007/0070069 | A1* | 3/2007 | Samarasekera et al. ...... | 345/427 |
| 2008/0037241 | A1* | 2/2008 | Von Der Brelie ............. | 362/145 |
| 2008/0220809 | A1* | 9/2008 | Hansen ...................... | 455/550.1 |

(Continued)

FOREIGN PATENT DOCUMENTS

| DE | 102005042268 | 5/2006 |
|---|---|---|
| EP | 1430850 A2 | 6/2004 |

(Continued)

OTHER PUBLICATIONS

International Search Report for corresponding international application No. PCT/EP2011/069888, mailing date Mar. 19, 2012.

*Primary Examiner* — Kashif Siddiqui
(74) *Attorney, Agent, or Firm* — Marshall, Gerstein & Borun LLP

(57) ABSTRACT

Method for allocating an operating address to a bus-enabled operating device for luminaires, including determining an absolute position or a relative position of the operating device by a position detection device, converting the position into an operating address, and storing the operating address for the operating device.

21 Claims, 2 Drawing Sheets

(56) References Cited

U.S. PATENT DOCUMENTS

| | | | |
|---|---|---|---|
| 2009/0002981 A1* | 1/2009 | Knibbe | 362/233 |
| 2009/0254154 A1 | 10/2009 | De Taboada et al. | |
| 2009/0254155 A1 | 10/2009 | Kanarsky et al. | |
| 2010/0169004 A1* | 7/2010 | Ono et al. | 701/207 |

FOREIGN PATENT DOCUMENTS

| | | |
|---|---|---|
| EP | 1736204 | 12/2006 |
| EP | 2008688 | 12/2008 |
| WO | WO-2008/058713 A1 | 5/2008 |
| WO | WO-2009/018529 | 2/2009 |

* cited by examiner

METHOD, APPARATUS AND SYSTEM FOR ADDRESSING OPERATING DEVICES FOR LUMINAIRES

BACKGROUND OF THE INVENTION

1. Field of the Invention

The present invention relates to the problem of allocating operating addresses to lamps/lights and the addressing of lamps/lights, particularly to a method for assigning an operating address to an operating device for illuminants, a method for finding the positions of operating devices for illuminants and an addressable operating device for illuminants.

2. Related Technology

Operating addresses of operating devices for illuminants, for example for lamps and lights, are generally independent of the location at which the operating devices are mounted. Positions of operating devices are planned and indicated for construction plans. One problem in this context is that the construction plans frequently change, but lighting plans with the positions at which the operating devices are meant to be mounted are occasionally not updated. It is also an occurrence that the operating devices are actually fitted differently than planned. As a result, operating device positions do not match and individual operating devices can be found only with difficulty. This also makes it difficult to actuate operating devices in a specific manner, since it is first necessary to check which operating device is actually situated at which location.

The invention is therefore based on the object of making it easier to locate operating devices for illuminants.

SUMMARY OF THE INVENTION

In one embodiment, the invention solves the underlying problem by means of a method for assigning an operating address to a (bus-compatible) operating device for illuminants, having the following steps: an absolute position or a relative position of the operating device is found by a position detection device, the position is converted into an operating address, and the operating address is stored for the operating device.

The method may comprise the step of the operating address being transmitted to a storage medium in a control unit.

The operating device can interchange position data with other operating devices.

The storage medium can store an additional identifier for the operating device.

The method may comprise the following steps: the position is determined to be a 2D position or a 3D position, if it is a 2D position: a check is performed to determine whether level information is available, and if level information is available then the level information is combined with the 2D position and the combination is stored in the storage medium.

In a further embodiment, the invention provides a method for finding the positions of operating devices for illuminants in a bus system, having the following steps: an operating address is assigned to an operating device, as described above, and the operating address is read and the read address is converted into a position for a lamp with which the operating device is associated.

In a further aspect, the invention provides a bus-compatible operating device for illuminants, having means for finding the absolute or relative position of the operating device and/or an interface for communicating with an external position detection device, and also means for converting the detected and transmitted position into an operating address.

The operating device may have a storage medium and/or may be connected thereto.

The storage medium may be non-volatile.

The operating device may have signaling means for radio and/or light signals.

The operating device may have a processing means which is connected to the interface and is set up to determine position data from data received via the interface.

The operating device may be set up to use the communication bus to interchange position data with other operating devices and/or a control unit.

The operating device may be set up to use the signaling means to interchange position data with other operating devices.

The operating device may be able to connect to the position detection device via an interface.

The storage medium may be set up to store additional identifiers.

In another aspect, the invention provides a position detection device for determining a position of an operating device for an illuminant, having a positioning unit for ascertaining position data and a communication module for transmitting the position data to the operating device.

The positioning unit may be a signal receiver for radio and/or light signals and/or a GPS receiver.

The position detection device may also have a display.

The communication module may be set up to request position data from operating devices in a range and/or to show positions of the operating devices on the display using the position data.

The position detection device may be set up to show the positions of the operating devices in conjunction with a surroundings plan, floor plan and/or site plan.

In yet another aspect, the invention provides a positioning system for determining a position of an operating device for an illuminant having an operating device as described above and having a position detection device as described above.

The positioning system may be set up to carry out a method as described above.

Further aspects of the invention are described below with reference to the drawings too.

DETAILED DESCRIPTION OF THE INVENTION

Figure 1:
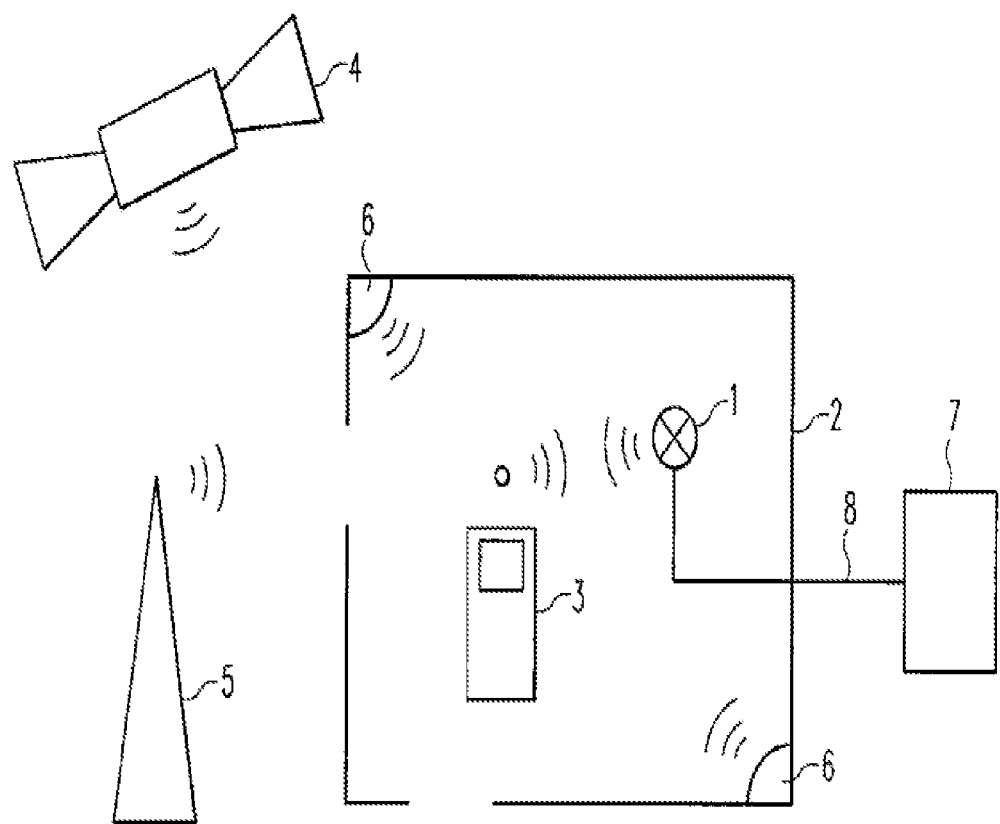
FIG. 1 shows a schematic illustration of an arrangement according to the invention for determining an operating device position.

The central concept of the invention is that the 2D or 3D position of an illuminant or of an operating device for illuminants is converted into an operating address. In this case, the position can be obtained absolutely (for example found by GPS) or relatively (e.g. by virtue of positioning methods within a building or a room).

When the address reproducing the 2D or 3D position has been requested centrally, a light plan can be produced and illuminants can be logically grouped, for example. In conjunction with a building plan, floor plan or CAD electrical plan, it is also possible to take the requested positions as a basis for explicitly associating an operating device for illuminants with a position and indicating the site thereof in the respective plan. This can also be accomplished by virtue of the requested positions being transferred from the operating address to a CAD or planning program and being able to be displayed at the relevant location in said program, or the relevant location/the relevant locations being able to be transferred to the respective plan or to a drawing.

By way of example, it is also possible for the positions of the operating devices to be transmitted (online) to a portable terminal, for example, however, so as to be displayed thereon. In conjunction with a stored or likewise transmitted plan, the operating device positions can then be shown on the terminal at an appropriate point in the plan.

The invention thus allows individual operating devices for illuminants or particular groups of operating devices for illuminants to be located.

Together with an operating device position, it is also possible for a piece of status information relating to an illuminant to be transmitted to the terminal, e.g. by a central control unit. This status can then be displayed together with the illuminant position on the mobile terminal, for example. It is also possible for an operating device to transmit a piece of status information, e.g. a state change, together with the operating address which contains the position to a control unit. The latter can then display the status/the state change.

In order to find the position of an operating device, it is possible to use known positioning methods, for example interior positioning methods.

One approach for position determination indoors is based on the use of infrared transmitters and receiver(s). The infrared transmitters emit a signal which can be evaluated by the receiver as a position. For particularly exact position determination, infrared lasers—which output highly focused infrared radiation and permit very precise measurement—are also used.

In addition, ultrasound positioning systems are known. The use of these involves using propagation time measurements for emitted ultrasound pulses to measure a distance from transmitter to receiver and thus to be able to determine a position (by means of trilateration). In this case, it is either possible for the signals to be emitted by a mobile transmitter and received by permanently installed receivers, or conversely permanently mounted transmitters emit signals which are detected by mobile receivers. It is also possible to use a radio frequency signal in order to identify a position. Since radio frequencies propagate more quickly than ultrasound, it is thus possible to obtain section lengths and to determine positions by using a "time difference of arrival" method, for example.

RFID (Radio Frequency Identification) can likewise be used to determine positions of operating devices in rooms. In this case, a transponder can be mounted on the operating device to be identified, which transponder can then be recognized by a reader. In this case, a distinction is drawn between passive transponders, without a dedicated power supply, and active transponders, which are equipped with a power supply. Passive transponders draw power from a field surrounding them which is produced by a reader, for example. Active systems achieve a greater range than passive systems, which is why they are particularly suitable for use as positioning system. Furthermore, RFID systems have the advantage that the number of RFID transponders which can be used is almost unlimited. In this case, a signal-strength-based method is suitable for locating the operating devices.

Bluetooth and other data radio techniques (WLAN, ZigBee) use radio-frequency electromagnetic waves for communication. Depending on the transmission power and the surroundings, these systems allow long ranges (e.g. up to 100 m), which means that they are also suitable for position determination in large rooms. In this case, position determination is possible by measuring signal strengths and using trilateration. Furthermore, a fingerprinting method is often used in practice as backup (in this case, fingerprinting means that each position has a particular associated configuration of signals strengths).

Ultrawideband denotes a wireless technology which is not tied to any frequencies and can likewise be used for interior position determination. The data can be transmitted over a very wide frequency spectrum, which is why already existing frequency bands can be used. It is advantageous that ultrawideband is able to penetrate materials. Ultrawideband can be used with trilateration as a positioning system, and under favorable conditions it achieves high levels of accuracy (up to 1.5 cm or better).

It goes without saying that techniques known from mobile radio can also be used to determine the position. By way of example, these may include the use:
 of recognized cell IDs,
 of path information an quantized loss or signal strength measurements,
 of quantized round trip time (RTT, in the case of (W)CDMA) or timing advance (TA, in GSM),
 of the rise in quantized noise, which indicates the load on a code division multiple access (CDMA) system,
 of radio link information, e.g. from the radio access bearer (RAB), and/or
 of quantized time.

Alternatively, it is possible to use other known position determination and measurement methods, e.g. from geodetics, for position determination.

It is also possible to associate not a single operating device but rather groups, arrays or other organizational units of operating devices and hence illuminants with a position and to transmit appropriate information therefor.

To determinate the position of operating devices for illuminants, it is possible, by way of example, for operating devices which are present in a room to be able to determine their relative position with respect to one another by using a data radio technique, such as ZigBee. The operating devices of the illuminants can then use triangulation, trilateration and/or propagation time measurement to determine a position by communicating with one another. To this end, the operating devices of the illuminants may be equipped with appropriate processing units. The positions can be reshaped into absolute positions in conjunction with an absolute position which has been determined by GPS or another positioning system, for example. There may also be an absolute position stored in an operating device of one illuminant, from which it is then possible to determine the positions of the other illuminants. When an absolute position is transmitted by means of the data radio technique, the operating devices can also determine their absolute position themselves.

In this case, the absolute position may also contain level information. Alternatively, the level information can be indicated separately and independently.

An operating device for an illuminant can alternatively be provided with an operating address which comprises position data during fitting. In this case, the operating device can be functionally connected to a position detection device during fitting, as a result of which its current position can be converted as an operating address and can be stored for the operating device in a memory.

An operating device may be equipped with a power converter and may comprise a storage medium. In this case, the storage medium may be non-volatile, which means that the data stored in the storage medium cannot be altered again following first storage. In addition, the operating device may have a processing means which permits access to the memory. In addition, the operating device may have an interface to a communication bus. The processing means can recognize, process and/or evaluate information received from the communication bus. In particular, the processing means can verify/process the information/queries received from the communication bus using the position data stored in the memory.

However, it is also possible for the position of the operating device to be determined after fitting by means of a replication system in a building (e.g. by using one or more interior positioning techniques as described at the outset). In this case, the replication system can include known reference points, e.g. absolute positions, for determining the operating device position. Such known positions may be building coordinates, for example, which have already been ascertained (e.g. by GPS).

The position stored for the operating device can be used itself or in combination with other information as an operating or communication address. The operating device can then be addressed by a control unit using said position. For example, the position data can be used together for an explicit operating device/illuminant ID.

The position data for an operating device also do not necessarily need to be stored on the operating device. It is also possible, for example in a (central) control unit, to store the ascertained position data together with an explicit identifier for each operating device, e.g. in a database or lookup table. Hence, it is possible to find a position for an operating device even when an operating device is faulty.

It is also possible to detect the position of any operating device during fitting together with an explicit identifier for each operating device in the position detection device. These captured position data can then be transmitted from the position detection device, for example to a central control unit. To this end, the position detection device may, by way of example, have a detection apparatus, for example a barcode or RFID reader, which allows the identifier of an operating device to be detected in order to permit it to be combined with the position data to form an operating address.

FIG. 1 describes an exemplary arrangement based on an embodiment of the invention: when fitting a lamp having an operating device 1 in a room 2, a position detection device 3 is used to ascertain position data. In order to find the position accurately, the position detection device 3 may in this case use satellite-assisted positioning systems 4 (GPS), terrestrial positioning aids 5, such as position determination using radio cells (GSM, CDMA), and/or systems 6 provided for interior position determination, such as infrared (laser) systems and/or radio systems.

The position found by the position detection device 2 is then either transmitted from the position detection device 2 to the operating device 1 and stored on the latter, for example with an identifier from the as an operating address, or is stored with an identifier detected from the operating device in the position detection device 2 for later transmission to a control unit 7. Alternatively, the operating device 1 can also transmit the position data to a control unit 7 via a communication bus 8. The position of the operating device may in this case be stored either on the operating device 1 or in the control unit 7, e.g. with the identifier of the operating device. The control unit 7 can then address the operating device using the position data.

Figure 2:
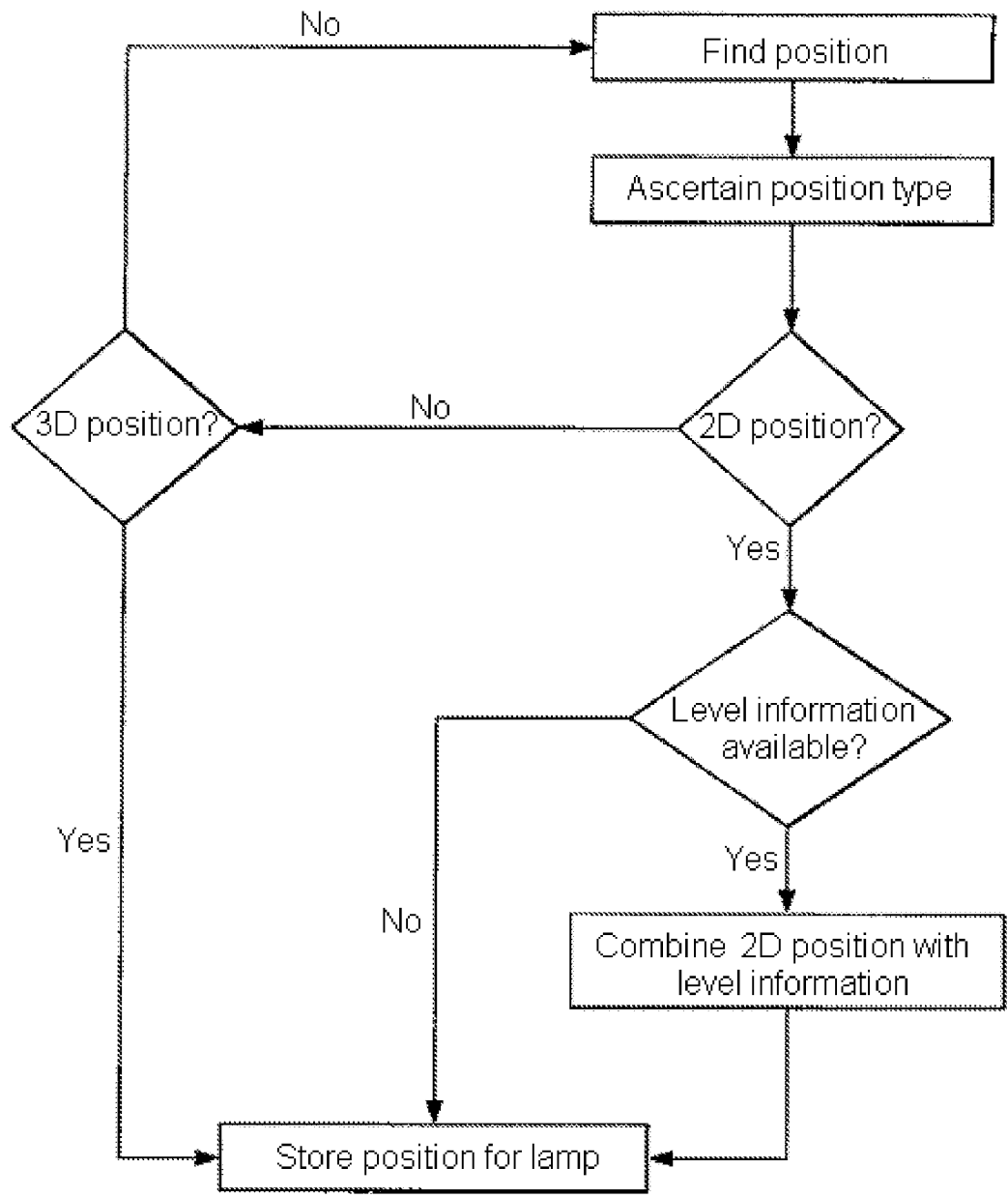
FIG. 2 shows a flowchart for the position determination according to the invention.

FIG. 2 schematically shows the position finding on an operating device. In this case, a check is performed, for example for a lamp, to determine what type of position data (2D or 3D data, e.g. position data with or without a level statement) has been ascertained. In the event of 3D data being available, the position data are stored as a position. If just 2D data are available, a check is performed to determine whether level information is available. This may also be information about floor(s) or other level statements defined for a building. If level information is available, it is combined with the 2D data and the combination is implemented for the operating device 1 as an operating address. If no level information is available, just the 2D data are stored.

The invention claimed is:

1. A method for assigning an operating address to a bus-compatible operating device for illuminants, the method being performed by the operating device for illuminants and comprising:
   detecting a 2D or 3D position of the operating device by a position detection device,
   converting the position into an operating address,
   assigning the operating address to the bus-compatible operating device for the illuminants, and
   storing the operating address for the operating device.

2. The method as claimed in claim 1, comprising:
   transmitting the operating address to a storage medium in a control unit.

3. The method as claimed in claim 1, wherein the operating device interchanges position data with other operating devices.

4. The method as claimed in claim 1, wherein the storage medium stores an additional identifier for the operating device.

5. The method as claimed in claim 1, comprising finding the position by:
   determining the position to be a 2D position or a 3D position,
   if the position is a 2D position: performing a check to determine whether level information is available, and if level information is available then combining the level information with the 2D position and storing the combination in the storage medium.

6. A method for finding the positions of operating devices for illuminants in a bus system, comprising:
   assigning an operating address to an operating device by a method as claimed in claim 1, and
   reading the operating address and converting the read address into a position for a lamp with which the operating device is associated.

7. A bus-compatible operating device for illuminants, comprising:
   means for detecting a 2D or 3D position of the operating device and/or an interface for communicating with an external position detection device to transmit the position,
   means for converting the position into an operating address, and
   means for assigning the operating address to the bus-compatible operating device for the illuminants.

8. The operating device as claimed in claim 7, wherein the operating device comprises a storage medium and/or is connected to a storage medium.

9. The operating device as claimed in claim 7, wherein the storage medium is non-volatile.

10. The operating device as claimed in claim 7, wherein the operating device has signaling means for radio signals and/or light signals.

11. The operating device as claimed in claim 7, wherein the operating device comprises said interface and processing means connected to the interface and the operating device is adapted to determine position data from data received via the interface.

12. The operating device as claimed in claim 7, wherein the operating device is adapted to use a communication bus to interchange position data with other operating devices and/or a control unit.

13. The operating device as claimed in claim 10, wherein the operating device is set up to use the signaling means to interchange position data with other operating devices.

14. The operating device as claimed in claim 7, wherein the operating device can be connected to the position detection device via an interface.

15. The operating device as claimed in claim 8, wherein the storage medium is set up to store additional identifiers.

16. A positioning system for determining a position of an operating device for an illuminant having an operating device as claimed in claim 7 and having a position detection device comprising a positioning unit for ascertaining 2D or 3D position data, and a communication module for transmitting the position data to the operating device.

17. The positioning system as claimed in claim 16, wherein the positioning system is set up to carry out a method comprising:

finding a 2D or 3D position of the operating device by a position detection device,
converting the position into an operating address,
assigning the operating address to the bus-compatible operating device for the illuminants, and
storing the operating address for the operating device.

18. The method as claimed in claim 1, wherein assigning the operating address to the bus-compatible operating device for the illuminants comprises assigning the operating address to the bus-compatible operating device for the illuminants during fitting of the operating device and/or illuminant.

19. The method as claimed in claim 1, wherein finding a 2D or 3D position of the operating device by a position detection device comprises one or more of: finding the position of the operating device with respect to another operating device and finding the position of the operating device using Radio Frequency Identification.

20. The operating device as claimed in claim 7, wherein the means for detecting a 2D or 3D position of the operating device comprises means for detecting the position of the operating device with respect to another operating device.

21. The operating device as claimed in claim 10, wherein the signaling means comprises a Radio Frequency Identification transponder.

* * * * *